INVENTOR
DAVID MacGREGOR
BY Strauch, Nolan & Diggins
ATTORNEYS

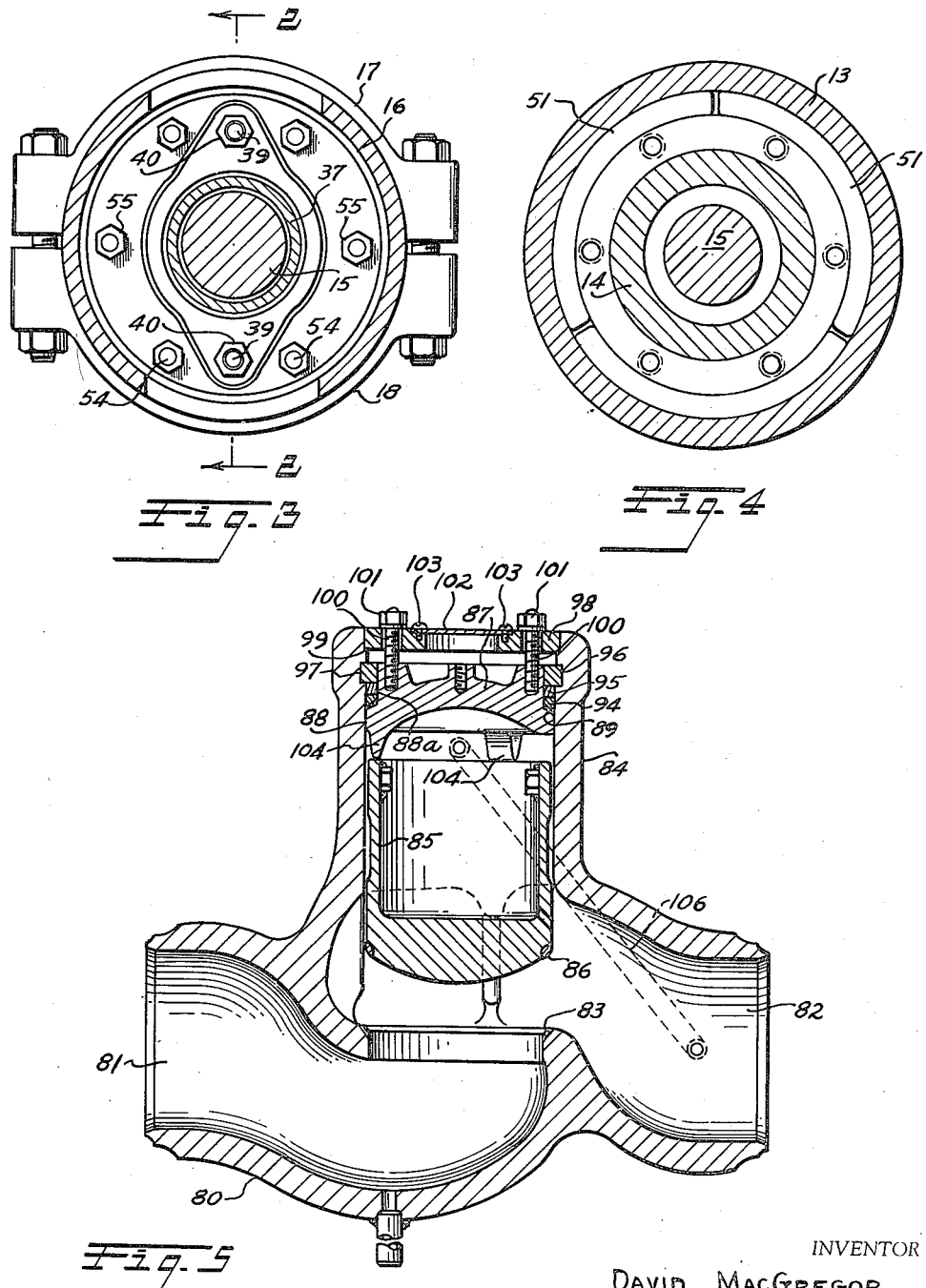

Patented Jan. 12, 1954

2,665,874

UNITED STATES PATENT OFFICE 2,665,874

BONNET AND SEALING STRUCTURE FOR VALVES

David MacGregor, East Chicago, Ind., assignor to Edward Valves, Inc., East Chicago, Ind., a corporation of Indiana Application November 3, 1950, Serial No. 193,969

6 Claims. (Cl. 251—49)

This invention relates to valve constructions particularly suited for controlling the flow of high temperature, high pressure fluids, such as steam, and more particularly to an improved sealing structure for valves of this type.

In valves of this kind, it is of primary importance that an effective seal be maintained between the separable components of the valve to minimize pressure and fluid loss through the valve.

Manufacturing and operating requirements also dictate the use of a sealing structure of the utmost simplicity which may be readily disassembled when inspection and repair of the valve are necessary and which may be readily reassembled to provide a seal of undiminished effectiveness.

In one form of my invention, I have provided a novel bonnet structure which is movable axially in the valve body under the influence of the internal pressures existing in the valve to establish a seal between the bonnet and body which thus varies in effectiveness in accordance with the operating requirements. This result is supplemented by the co-operation of the novel bonnet and sealing structure with the closure element of the valve when the valve is in its fully opened position. This construction obviates the necessity for the establishment of high initial sealing pressures in the valve and the maintenance of such sealing pressures during periods when the valve is closed or out of operation thus extending the life of the sealing structure and facilitating disassembly. To further facilitate disassembly, I have provided a segmental locking ring which is designed to absorb the thrust applied by movement of the bonnet and which may be readily removed even after extended periods of service.

Accordingly, it is a primary object of the present invention to provide an improved sealing structure for a valve which may be readily assembled or disassembled and easily repaired and adjusted.

It is a further important object of the invention to provide an improved sealing means for a valve which is rendered increasingly effective as the pressure and velocity of the gases flowing through the valve increase.

It is also an object to provide a novel bonnet and sealing structure which co-operates with the valve closure element when the latter is in its fully open position to provide a seal of superior operating effectiveness.

It is also an object to provide a novel retaining and adjusting means for the valve sealing structure.

It is a further object of the invention to provide a novel valve bonnet.

Further objects and advantages will become apparent as the description proceeds in connection with the accompanying drawing in which.

Figures 1, 2, 6:
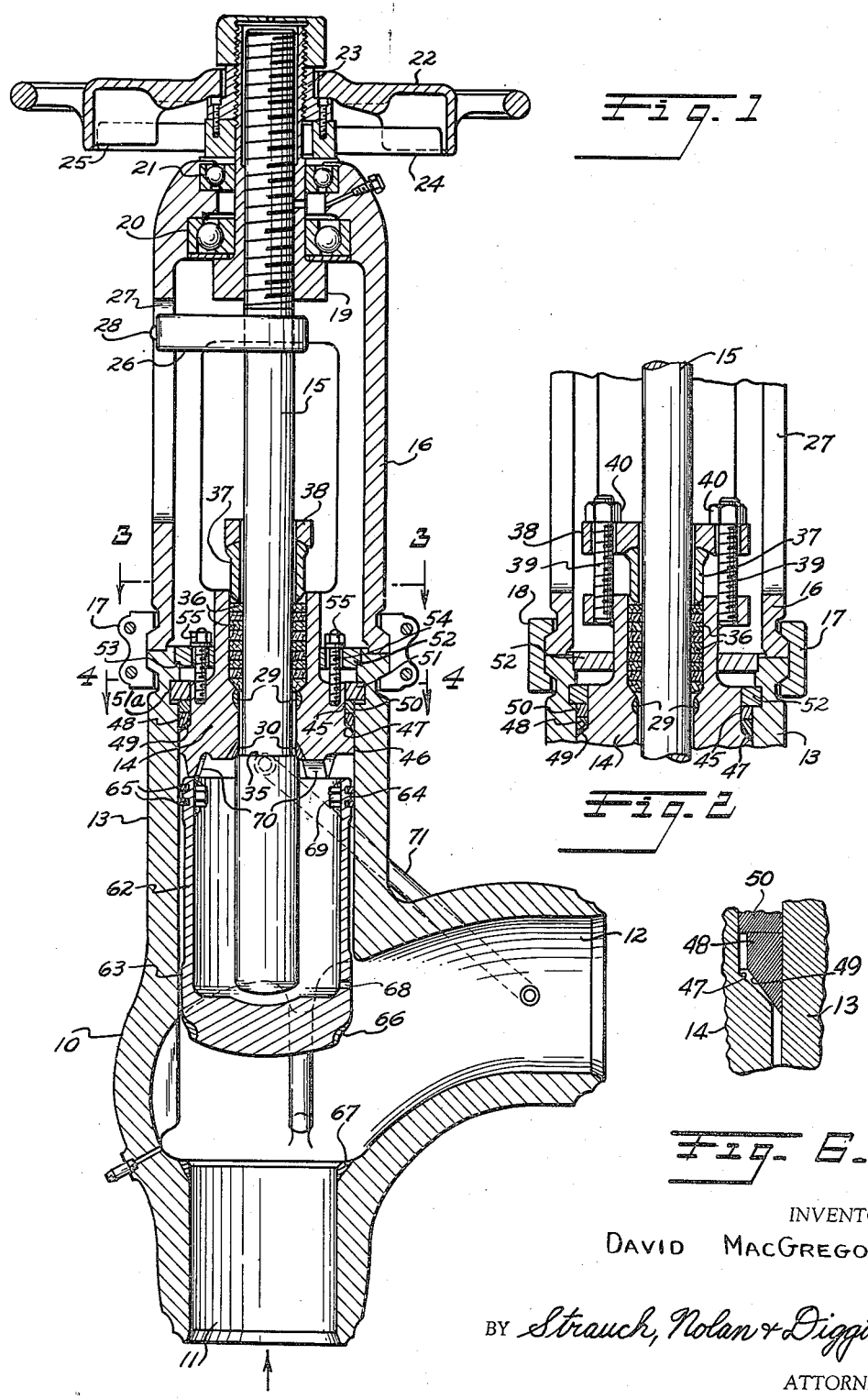
Figure 1 is a vertical sectional view of a valve incorporating the present invention.
Figure 2 is fragmentary sectional view of the valve of Figure 1 taken on a plane perpendicular to the plane of Figure 1.

Figures 3 and 4 are sectional views of details of the valve of Figure 1 taken along lines 3—3 and 4—4 of Figure 1, respectively; and Figure 5 is a central sectional view of a valve incorporating a modified form of the invention.

Figure 6 is a fragmentary view showing certain of the components of the sealing structure on enlarged scale.

Referring now to Figures 1–4, a valve body 10 of the angle type has an inlet 11 and an outlet 12 substantially at 90° from the inlet. Coaxial with the inlet 11 the body has a tubular extension 13 wherein is located a bonnet 14 having a central passage for a valve stem 15. A yoke 16 is seated upon and clamped to the top of the extension 13 by lock rings 17 and 18 which engage parallel exterior grooves in the body and the yoke. A yoke bushing 19 is rotatably journalled in bearings 20 and 21 positioned in recesses in the top of yoke 16 and is internally threaded for engagement with the top of the valve stem 15. An impactor type hand wheel 22 is journalled for rotation on a bushing 23 which is fastened to a cross arm 24 keyed to the yoke bushing 19 so that when the hand wheel is spun internal projections 25 thereon will strike the arms of the cross arms 24 to rotate the yoke bushing 19 and raise or lower the valve stem 15. A guide collar 26 is fastened to the stem 15 and extends through an opening 27 in the yoke thus preventing rotation of the valve stem. At its outer end, the guide collar 26 is provided with an indicator 28 which cooperates with index marks adjacent one edge of aperture 27 to indicate the position of the valve stem.

The bonnet 14 provides a second guide means for the valve stem, having hardened machined surfaces 29 and 30 for this purpose. The stem 15 which passes through the bearings 29 and 30 is slightly reduced in diameter thus forming a shoulder 35 on the stem which engages a coned portion on the bottom of the bearing 30 when the stem is in the full raised position. To seal the passage in the bonnet 14 against the pressure of the fluid in the valve body 10, high temperature packing rings 36 in bonnet 14 are compressed by a gland 37 to insure against leakage of fluid around the valve stem particularly when the valve stem is not in its fully raised position. The gland 37 is urged against packing rings 36 by a gland flange 38 which is adjustably secured to the upper portion of the bonnet 14 by gland studs 39 and gland bolt nuts 40.

The structure thus far generally described forms no part of the present invention but is claimed and more completely described in my copending application for Valve Construction Serial No. 662,341, filed April 15, 1946.

As previously stated, the present invention relates to improvements in the construction of the bonnet and valve body sealing means and the cooperation of the closure elements with the sealing means to provide a seal of superior effectiveness.

Referring now in detail to the novel bonnet and sealing construction, a reduced section 45 of the bonnet joins a flange 46 and in an inclined shoulder 47. A relatively soft pressure seal gasket 48 of soft iron, asbestos, or the like depending upon the service requirements of the valve, having a lower inclined surface 49, is positioned around section 45 above shoulder 47. The lower surface 49 of the gasket is inclined at a more acute angle with the wall of extension 13 than the shoulder 47 so that under low pressure conditions the surface 49 and the shoulder 47 are substantially in line contact.

A hard steel spacer ring 50 is held against the upper end of gasket 48 by a segmental retainer 51 which is received in an annular recess 51a in extension 13 of the valve body. The recess 51a is of greater width than the retainer 51 to facilitate disassembly of the retainer.

An annular bonnet retainer ring 52 is positioned on a shoulder 53 formed adjacent the upper edge of extension 13 and is adjustably secured to bonnet 14 by retainer studs 54 which extend freely through ring 52 and by nuts 55. Since ring 52 is restrained against downward movement and bonnet 14 is free to move upwardly against gasket 48, the gasket may be subjected to any desired preload pressure by adjustment of nuts 55. Because of the differential angle between the shoulder and the surface 49 any appreciable preload will wedge the gasket against the wall of the valve body to form a positive seal therewith.

A tubular valve disk or closure element 62 is guided for reciprocation in extension 13 of the valve body on lands 63 and 64, land 64 having piston rings 65 received therein. When the disk is placed in the fully lowered position either by the valve stem 15 or by a reverse flow of fluid through the valve body, mating stellited surfaces 66 and 67 on the disk and the valve body, respectively, are adapted to be sealingly engaged to prevent the passage of fluid through the valve body. A restricted passage 68 is provided in the lower end of the disk to drain condensate. To facilitate removal of the disk, lugs 69, which may be engaged by hooks or similar means, are welded to the interior of the disk. When the stem 15 is fully raised and pressure is supplied at inlet 11 the disk is lifted off its seat and its upper end is urged against projections 70 extending downwardly from bonnet 14 by the dynamic force of the fluid flowing through the valve and impinging on the lower surface of the valve disk. This upward force is augmented by a static pressure differential established across the bottom wall of disk 62 by an equalizer tube 71 which is substantially larger than passage 68, which connects the space above the disk with an area of relatively low pressure adjacent the valve outlet. The cumulative effect of these forces is sufficient to drive the disk against the bonnet and urge the bonnet and retainer rings upwardly as a unit compressing the sealing gasket 48 against the wall 13. Since the forces acting on the gasket 48 through the disk 62 are proportional to the pressure and velocity of the gases flowing through the valve, the effectiveness of the sealing structure will be increased in proportion to these factors. This novel arrangement thus provides a seal which is automatically adjusted in response to variations in the characteristics of fluid to be sealed. It is to be noted that the projections 70 prevent closure of the tube 71 by the valve disk to assure the maintenance of the differential pressure across the valve in its fully opened position.

Figure 5 illustrates a sealing structure modified for use in a check valve of the type in which the valve is controlled entirely by the direction of flow of fluid through it.

A globe type valve body 80 is provided with an inlet 81, a coaxial outlet 82, and a horizontal stellited valve seat 83. The body has a vertical extension 84 in which a valve disk or closure element 85, similar to disk 62 previously described, is reciprocably received. Disk 85 is provided with a stellited seating surface 86 which engages the seat 83 when the valve is in its lowermost position.

A pressure seal cover 87 is positioned at a point adjacent the upper end of the extension 84 with an enlarged land 88 in frictional engagement with the inner wall of the extension. A reduced section 88a of the cover is joined with the land 88 by means of an inclined shoulder 89. A pressure seal gasket 94, having a lower surface at an acute angle with shoulder 89, is positioned above shoulder 89 and held in place by means of a spacer ring 95 and a segmental gasket retainer 96, the latter being held in a slot 97 in extension 84. The gasket ring 94, spacer ring 95, and retainer 96 are preferably identical to the corresponding elements 48, 50, and 51, respectively, previously described and are telescoped successively around section 88a of the cover 87.

An annular cover retainer 98, seated on shoulder 99 spaced from the upper end of extension 84, is adjustably secured to pressure seal cover 87 as by studs 100 which pass freely therethrough and nuts 101. A cover retainer plate 102 closes the upper end of the extension 84 and is secured to retainer 98 as by screws 103. The relatively soft gasket 94 may be wedged against the interior wall of extension 84 by adjustment of nuts 101 in the manner previously described in connection with the structure of Figure 1.

When the fluid pressure of the inlet 81 exceeds the pressure of the outlet 82 the disk will be lifted off its seat and in its fully opened position will be urged against projections 104 extending from cover 87, by the dynamic action of the fluid which is augmented by the static pressure differential established across the bottom wall of the disk by an equalizer tube 106, as previously described. As in the modification of Figure 1, the disk 85 thus adjustably compresses the gasket 94 with a force which is proportional to the dynamic and static pressure existing within the valve. In both forms, the sealing structure may be assembled, inspected and repaired with ease, and in each case the seal may be adjusted manually to any desired degree of effectiveness and is thereafter automatically adjusted in accordance with the static and dynamic conditions prevailing in the fluid within the valve.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a valve having a main body portion for the passage of fluid and a hollow extension above said main body portion for receiving a valve stem, said extension having an annular groove in its inner surface and an upwardly facing shoulder above said groove; an annular bonnet having an internal surface for guiding said stem and an external surface slidingly engaging said extension, said external surface terminating in an annular inclined shoulder, an annular sealing gasket telescoped around said bonnet above said inclined shoulder having a sloping surface inclined with respect to said inclined shoulder, the angle between said sloping surface and said extension being smaller than the angle between said inclined shoulder and said extension, a fixed segmental retainer ring for said gasket telescoped around said bonnet and extending into said groove in said extension, a second retainer ring telescoped around said bonnet and adapted to seat on said upwardly facing shoulder in spaced relation with said fixed retainer ring, and means connecting said second retainer ring and said bonnet for moving said bonnet upwardly to urge said inclined shoulder into forced engagement with said sloping surface whereby said gasket is forced into sealing engagement with said extension over an area of substantial width, said bonnet being upwardly movable independently of said fixed retainer ring under the influence of the pressure of said fluid to increase the area of sealing engagement between the gasket and the extension.

2. In a valve having a main body portion for the passage of fluid and a hollow extension above said main body portion for receiving a valve stem, an annular bonnet having an internal surface for guiding said stem and an external surface slidingly engaging said extension, said external surface terminating in an annular inclined shoulder, an annular sealing gasket telescoped around said bonnet above said shoulder, a sloping surface on said gasket inclined with respect to said shoulder, the angle between said sloping surface and said extension being smaller than the angle between said inclined shoulder and said extension, a fixed segmental retainer ring for said gasket telescoped around said bonnet and extending into an annular recess in said extension, a second retainer ring telescoped around said bonnet in spaced relation with said fixed retainer ring, means on said hollow extension engaging said second retainer ring to prevent downward movement thereof, means connecting said second retainer ring and said bonnet for moving said bonnet upwardly to urge said shoulder into forced engagement with said sloping surface whereby said gasket is forced into engagement with said extension with a predetermined sealing force, a valve disk reciprocably received in said extension, and means to establish a pressure differential across said disk to urge said disk upwardly against said bonnet to augment said predetermined sealing force.

3. The valve according to claim 2 wherein said last mentioned means comprises a conduit connecting the upper surface of said disk to a low pressure region of said valve body.

4. In a valve having a main body portion for the passage of fluid and a hollow extension above said main body portion for receiving a valve stem, said extension having an annular groove in its inner surface and an upwardly facing shoulder above said groove; an annular bonnet having an internal surface for guiding said stem and an external surface for slidingly engaging said extension, said external surface terminating in an annular inclined shoulder, an annular sealing gasket telescoped around said bonnet above said inclined shoulder, a sloping surface on said gasket inclined with respect to said inclined shoulder, the angle between said sloping surface and said extension being smaller than the angle between said inclined shoulder and said extension, a fixed segmental retainer ring for said gasket telescoped around said bonnet and extending into said groove in said extension, a second retainer ring telescoped around a reduced portion of said bonnet and adapted to be seated on said upwardly facing shoulder above said first retainer ring, and means connected to said bonnet passing freely upwardly through said second retainer ring for moving said bonnet upwardly to urge said inclined shoulder into forced engagement with said sloping surface whereby said gasket is forced into sealing engagement with the inner surface of said extension over an area of substantial width, said bonnet being freely upwardly movable independently of said fixed retainer ring under the influence of the pressure of said fluid within said body to increase the area of sealing engagement between said gasket and said inner surface of said extension.

5. In a valve having a main body portion for the passage of fluid and a hollow extension above said main body portion for receiving a valve stem and valve disk, an axially movable bonnet surrounding a portion of said stem and having an external surface slidingly engaging said extension, said external surface terminating in an annular inclined shoulder, an annular sealing gasket telescoped around said bonnet above said shoulder having a sloping surface inclined with respect to said shoulder, a fixed segmental retainer ring for said gasket telescoped around said bonnet and extending into an annular recess in the inner surface of said extension, separate retaining means for said bonnet and engaging said hollow extension to prevent downward movement thereof whereby to force said shoulder onto said sloping surface with a predetermined initial pressure while permitting free upward movement of said bonnet, and means independent of said stem operable when the valve is in its fully opened position for urging said disk upwardly against the lower surface of said bonnet to augment said initial sealing pressure.

6. In a valve having a main body portion for the passage of fluid and a hollow extension above said main body portion open at its upper end; a movable pressure seal cover mounted in said extension and having an external surface in engagement therewith, said surface terminating at its upper end in an annular inclined shoulder; an annular sealing gasket telescoped around said cover above said shoulder having a lower sloping surface inclined with respect to said shoulder; the angle between said sloping surface and said hollow extension being smaller than the angle between said inclined shoulder and said extension; an annular recess in said extension having its upper edge spaced below said upper end of said extension; a segmental retainer ring for said gasket mounted in said recess and telescoped around said cover; an upwardly facing annular shoulder in said extension intermediate said recess and the upper end of said extension; a cover retainer seated on said upwardly facing shoulder out of contact with said cover; and means connected to said cover passing freely upwardly through said cover retainer for moving said cover upwardly to urge said inclined shoulder into forced engagement with said gasket whereby said gasket is forced into sealing engagement with said cover and said extension.

DAVID MacGREGOR.

References Cited in the file of this patent

UNITED STATES PATENTS

| Number | Name | Date |
|---|---|---|
| 1,677,126 | Dennis | July 17, 1928 |
| 2,305,590 | Marburg | Dec. 22, 1942 |
| 2,426,392 | Fennema | Aug. 26, 1947 |